United States Patent [19]
Tersch

[11] 3,776,011
[45] Dec. 4, 1973

[54] DOUBLE DIE GEAR ROLLING MACHINE

[75] Inventor: Richard W. Tersch, Grosse Pointe Woods, Mich.

[73] Assignee: Lear Siegler, Inc., Santa Monica, Calif.

[22] Filed: May 10, 1972

[21] Appl. No.: 252,312

[52] U.S. Cl. .................................. 72/94, 72/108
[51] Int. Cl. ............................................ B21h 5/02
[58] Field of Search ................. 72/94, 108; 29/90 B, 29/159.2; 40/1.6 R

[56] References Cited
UNITED STATES PATENTS

| | | |
|---|---|---|
| 3,552,167 | 1/1971 | Bregi et al. ........................ 29/159.2 |
| 3,631,704 | 1/1972 | Leonard et al. .................... 29/159.2 |
| 3,599,464 | 7/1971 | Leonard, Jr. et al. ............. 29/159.2 |

Primary Examiner—Lowell A. Larson
Attorney—Donald P. Bush

[57] ABSTRACT

A gear rolling machine has circular gear-like dies, one of which rotates in a fixed position and the other of which moves radially toward and away from the stationary die. A work gear is mounted on a spindle and floats between the dies during the rolling operation, but moves to an intermediate position when the dies are separate.

6 Claims, 1 Drawing Figure

PATENTED DEC 4 1973 3,776,011
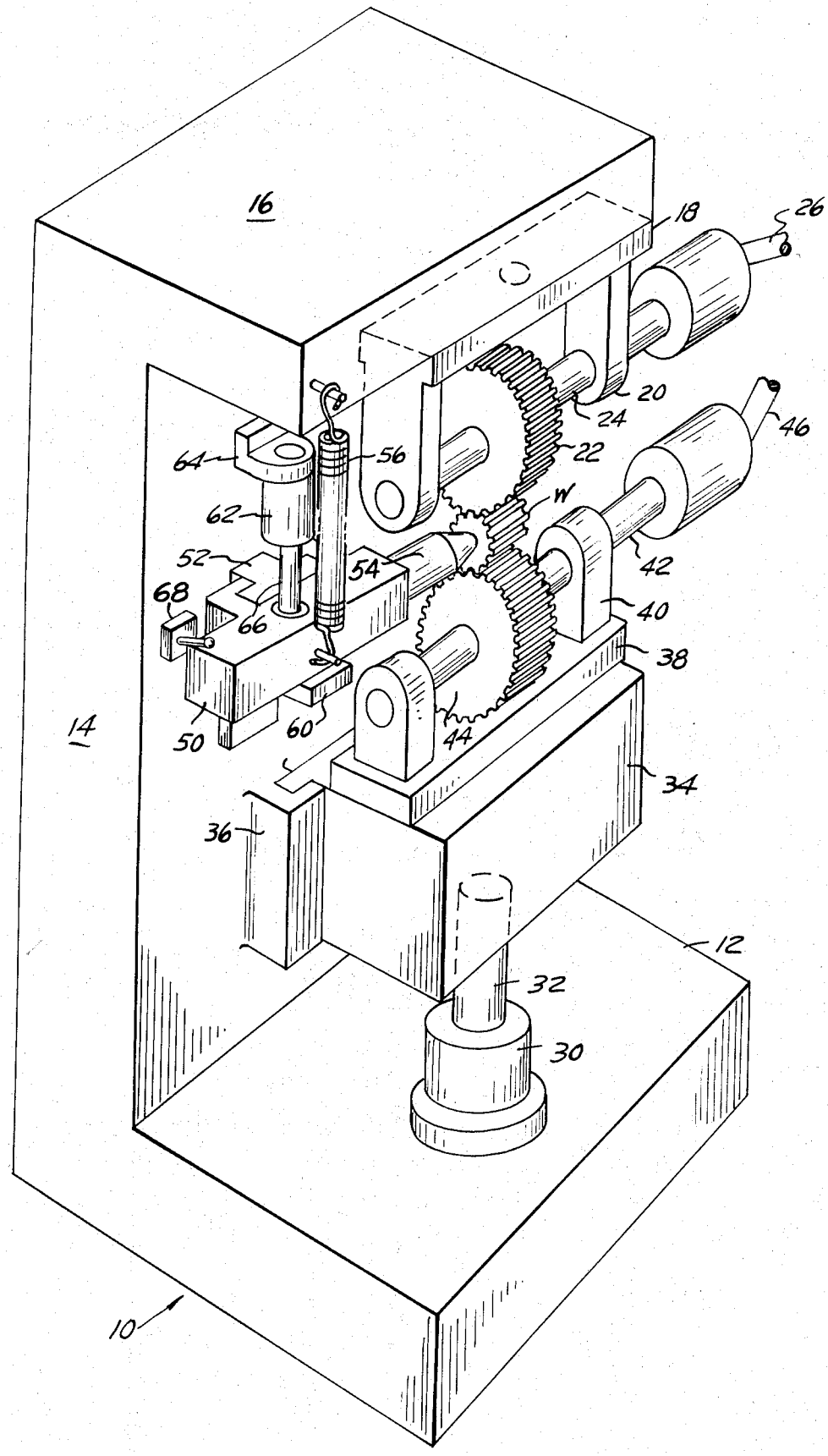

DOUBLE DIE GEAR ROLLING MACHINE

BRIEF SUMMARY OF THE INVENTION

A gear rolling machine includes a stationary support for a rotary gear-like die and includes means for rotating the die at a predetermined speed.

Movable on the frame of the machine toward and away from the stationary die is a slide which carries a rotary support for a movable circular gear-like die, the die moving radially with respect to the die which rotates in a fixed position.

Movably mounted on the frame of the machine is a slide which carries a rotary support for a work gear. The work gear in the gear rolling operation occupies a position between the fixed die and the movable die and is required to float so that it is centered during the gear rolling operation.

A requirement, particularly where the work gears are loaded and unloaded by automatic mechanism, is that when the movable die is moved away from the stationary die, the work support moves into an intermediate position in which the work gear is out of mesh with both the stationary die and the movable die.

In the past, ratio mechanism has been provided which by means of levers or a rack and pinion, moves the work support slide an amount exactly equal to one-half the movement of the movable die. Such an arrangement is shown in Leonard et al. U.S. Pat. No. 3,533,258.

In another arrangement, the work support is movable vertically under the influence of gravity and when the movable die is moved downwardly away from the stationary die, the work slide moves downwardly to an intermediate position, where it is engaged by a stop. When the movable die is moved upwardly to initiate the gear rolling operation, the movable die itself engages the work gear and moves the work gear directly and the work gear support as a consequence thereof into a position in which the work gear is in mesh with the upper stationary die. Such an arrangement is shown in Gleason et al. U.S. Pat. No. 1,669,818.

A third solution to the problem is proposed in prior copending Motz et al. application Ser. No. 159,733, filed July 6, 1971.

As disclosed in this copending application Ser. No. 159,733, spring means are provided urging the work support toward the stationary die and effective when such movement is permitted, to move the work slide and the work gear carried thereby to a position in which the work gear enters into full mesh with the stationary die. In this arrangement a lost motion connection is provided between a movable die support and the work gear support such that upon completion of a gear rolling operation, the movable die support moves away from the work gear, which at this time remains in tight mesh with the stationary die. After the movable die has moved sufficiently away from the work gear, the lost motion mechanism takes up and further movement of the movable die moves the work support in a direction to in turn move the work gear out of mesh with the stationary die to an intermediate position. This movement of the work gear of course takes place against the action of the spring which biases the work gear toward the stationary die.

While this last operation is satisfactory, certain beneficial results are obtained if the movement of the work support causing the work gear to move into mesh with the stationary die can be controlled independently of the movement of the movable die. In this way assurance may be provided that the work gear is fully meshed with the stationary die and is properly rotating in timed relation therewith before means are actuated to cause movement of the movable die into meshing engagement with the stationary die.

In the simplest embodiment of this invention the work support is provided with biasing means, such for example as a spring, counterweight, or the like, normally effective to move the work slide in a direction to cause the work gear to enter into tight mesh with the stationary die. Means are provided acting directly between the frame of the machine and the work slide, and completely independent of the movable die slide, to move the work support against the action of the biasing means away from the stationary die. This means may for example take the form of a fluid cylinder operated in sequence with a fluid actuated piston and cylinder device effective to move the movable die slide toward the stationary die with sufficient force to produce the gear rolling operation.

BRIEF DESCRIPTION OF THE DRAWING

The FIGURE is a diagrammatic perspective view of a gear rolling machine constructed in accordance with the present invention.

DETAILED DESCRIPTION

The gear finishing machine of the present invention comprises a frame 10 having a base portion 12, a column portion 14, and an overhanging, forwardly projecting portion 16. Suspended at the lower side of the overhanging portion 16 is an adjustable bracket 18 including arms 20 between which a rotary gear-like die 22 is carried by a drive spindle 24. The die 22 during a gear finishing operation remains in a stationary position, and while it is of course driven in rotation it will hereinafter be referred to as the stationary die.

Means are provided for driving the stationary die 22 in rotation and this means comprises a drive shaft 26.

Mounted on the forwardly projecting base 12 is a device for applying pressure to a movable die and in the embodiment illustrated this comprises a piston and cylinder device 30 having a piston rod 32 extending upwardly and connected to a vertically movable knee or die slide 34. The knee is vertically movable in ways indicated at 36 provided on the front of the column 14 and carries at its upper end a plate 38 having arms 40 carrying a drive shaft 42 which supports the vertically movable and rotatable gear-like die 44. The shaft 42 is driven by a shaft 46 which is driven in timed relation to the input shaft 26 previously referred to. The arrangement is such that the dies 22 and 44 are driven in the same direction in properly timed relation with their teeth in properly timed relation to the teeth of a work gear W.

The work gear W is mounted on a support 50 vertically movable on ways indicated at 52 located at the front of the column 14. The work gear W is mounted for free rotation by a rotary support 54 carried by the vertically movable slide support or slide 50. If desired, the rotary support 54 may be connected as by a piston and cylinder device within the support 50 to move the work gear axially into and out of the plane occupied by the dies 22 and 44. Also of course, a suitable outboard support may be provided to engage the right hand end of the work gear W, as seen in the FIGURE.

Connected between the forwardly projecting portion 16 of the frame and the vertically movable work support 50 is a spring 56 herein illustrated as a simple tension spring. It is to be understood that the strength of the spring is sufficient to lift the work slide 50 substantially upwardly to bring the work gear W into tight mesh with the stationary die 22.

While a simple tension spring is illustrated herein for simplicity, in practice a compression spring and rod assembly would probably be provided. Alternatively of course, the upward movement of the work slide may be accomplished by a suitable counterbalance mechanism as will be well understood.

Projecting forwardly from the front of the column 14 is an abutment 60 which may be vertically adjustable but which in operation is maintained in a fixed position. The abutment 60 determines the lowermost position of the work slide 50 as shown in which the work gear W is out of mesh with both the upper and lower dies 22 and 44.

Also connected between the frame 10 and the vertically movable work slide 50 is a motion controlling device 62 herein illustrated as a piston and cylinder device. Specifically, the cylinder is connected by a bracket 64 to the front face of the column 14 and the piston rod 66 is connected to the work slide 50.

In operation, assume that in the illustrated position the work piece W is in tight mesh with the stationary die 22 and the movable die 44, and that a gear rolling operation has just been completed. At this time, the knee 34 is moved downwardly by terminating hydraulic pressure to the cylinder 30 or reversing the same if necessary, thus moving the movable die 44 downwardly into clearance with respect to the finished work gear W. At this time the work gear will remain in tight mesh with the stationary die 22 by virtue of energization of spring 56 and/or the cylinder 62 in the appropriate direction. When the knee 34 has reached its lowermost position, or has reached a predetermined point in its travel toward its lowermost position, fluid pressure is applied to the cylinder 62 to move the piston rod 66 downwardly against the action of spring 56 and bring the finished work gear out of mesh and into a clearance position with respect to the stationary die 22. This intermediate position is determined by engagement between the work slide 50 and the abutment 60.

At this time the finished work gear is removed and a new work piece is replaced on the rotary support or spindle 54. Upon completion of the loading operation the application of fluid pressure to the cylinder 62, urging the slide 50 downwardly is terminated and the spring 56, is thereupon effective to raise the slide 50 to bring the new work gear into tight mesh with the stationary die. This meshing engagement between the work gear and the stationary die normally takes place without difficulty but occasionally the crests of the teeth abut and meshing engagement does not take place. Accordingly, it is desirable to delay application of rolling pressure to the cylinder 30 until meshing engagement between the work gear and the stationary die 22 has taken place. This may be accomplished by a limit switch 68 which is closed only when the work support 50 has reached a predetermined elevated position indicating that the teeth of the work gear and die have entered into a meshed relationship.

At this time, the work gear is being driven in properly timed relation by the stationary but rotating die 22 and hence its teeth are properly timed with respect to the teeth of the movable rotating die 44 by the means which insures properly timed relation between the shafts 26 and 46. Thus, as the knee 34 moves upwardly, proper meshing engagement without interference between the teeth of the work gear W and the movable die 44 is positively insured.

Since the operation is effective to maintain the work gear in tight mesh with the stationary die 22, the work gear floats freely into a centered position between the stationary and movable dies 22,44, and since this floating movement is largely the result of the action of the spring 56 on the slide rather than forces applied directly to the work gear, no binding or unequal application of pressure to the teeth of the work gear can occur.

While the foregoing contemplates an arrangement in which the spring 56 is effective to move the slide 50 upwardly, it will be appreciated that by an adjustment or selection of a spring of somewhat different characteristics, the spring may serve as a partial counterbalance which will nevertheless permit the work slide 50 to move downwardly into the intermediate position determined by engagement with the abutment 60 when the piston and cylinder device 62 is not energized. With this operation, the initial step of a gear finishing cycle takes place by the application of pressure to the cylinder 62 in a direction to move the slide 50 upwardly, and this application of pressure continues throughout the gear rolling cycle.

After the knee 34 has moved downwardly, the application of pressure to the cylinder 62 is discontinued and the slide 50 may move downwardly by gravity to the intermediate position.

It will also be observed that vertical movement of the slide 50 may be obtained without the use of a spring, counterbalance, or the like, simply by the application of pressure in opposite directions to the cylinder 62 to effect vertical movement of the work gear in properly timed relation to vertical movement of the knee 34 by means which is nevertheless independent of actual vertical movement of the knee 34.

I claim:

1. A gear rolling machine comprising a frame, a rotatable die support on the frame for a stationary rotatable die, a die slide movable on the frame, a second rotatable die support on the die slide for a movable rotatable die movable upon movement of the slide radially of the stationary rotatable die, a work slide movable upon the frame including a rotatable work support for a work gear adapted to position the work gear directly between the stationary and movable dies, means for driving both die supports in rotation in the same direction and in timed relation, a pressure applying means connected between the frame and the die slide to move the die slide in rectilinear movement such as to cause the die carried thereby to move radially of the stationary die between a loading position in which the dies are separated to provide for loading and unloading a work gear on the work support and a working position in which the work gear is rotated under pressure between the dies, and non-positive means connected between the frame and the work slide for effecting movement of the work gear completely independently of movement of the die slide between a loading position in which the work gear is spaced from both the stationary and movable die, and a working position in which the work gear is in tight mesh with the stationary die, and means for actuating said non-positive means to move the work slide to move the work gear from its loading position toward the stationary die prior to movement of the die slide to move the movable die from its loading position toward the work gear.

2. A machine as defined in claim 1 which comprises in addition means responsive to movement of said work slide into a position in which the teeth of the work gear have entered into a condition of mesh, to actuate the pressure applying means to initiate movement of said die slide away from its loading position.

3. A machine as defined in claim 1 in which the means interconnecting the frame and work slide comprises a fluid piston and cylinder device.

4. A machine as defined in claim 3 in which resilient means are provided interconnecting the frame and the movable work slide.

5. A machine as defined in claim 4 in which the resilient means is effective to produce movement of the work slide in a direction to cause a work gear thereon to move into tight mesh with the stationary die.

6. A machine as defined in claim 5 in which the piston and cylinder device is operable upon completion of a gear rolling cycle to move the work slide away from the position in which the work gear is in tight mesh with the stationary die against the action of the resilient means to an intermediate position.

* * * * *